Patented Nov. 20, 1945

2,389,187

UNITED STATES PATENT OFFICE 2,389,187

OXIDATION OF ORGANIC COMPOUNDS

James Gordon Napier Drewitt, London W. 1, England, assignor to British Celanese Limited, London, England, a company of Great Britain No Drawing. Application November 6, 1942, Serial No. 464,783. In Great Britain January 14, 1942

3 Claims. (Cl. 260—603)

This invention relates to the oxidation of organic compounds, and is especially concerned with oxidations of the type which can be effected by means of lead tetracetate.

It is known that lead tetracetate is a useful oxidising agent having a specific action on alpha-glycols, on compounds having a non-aromatic double bond and on compounds having in the molecule a "reactive" carbon atom, i. e. a carbon atom to which is attached at least one hydrogen atom and adjacent to which is an activating group, e. g. a keto group, a benzene ring or a non-aromatic double bond. Of the afore-mentioned groups of compounds the alpha-glycols are split to aldehydes, compounds containing a non-aromatic double bond give at least partly glycol diacetates, and compounds with a reactive carbon atom are converted to acetates in which the hydrogen atom or one of the hydrogen atoms attached to the said carbon atom is replaced by an acetate radicle. Examples of such oxidations are the splitting of ethylene glycol to two molecules of formaldehyde, the conversion of cyclohexene to a mixture of cyclohexane-1:2-diol diacetate $\Delta^2$-cyclohexenol acetate, and the production of mono-oxy-acetone acetate or dioxy-acetone diacetate from acetone. It will be noted that cyclohexene reacts in two ways, since it contains a "reactive" carbon atom in addition to a non-aromatic double bond.

Another oxidation for which lead tetracetate is applicable is the conversion of alcohols to aldehydes or ketones, e. g. the production of acetaldehyde from ethyl alcohol or of acetone from isopropyl alcohol.

Precisely similar oxidations can be effected by means of lead tetra-salts of other carboxylic acids, especially lower aliphatic acids e. g. lead tetrapropionate or lead tetrabutyrate.

In the present specification reactions of the various types exemplified above are all referred to as oxidations and compounds which can be oxidised by means of lead tetra-salts are described simply as oxidisable compounds.

The conditions hitherto employed for effecting the above oxidations generally involve the use of lead tetracetate prepared by slowly adding red lead to a large excess of stirred glacial acetic acid at a temperature of from about 60 to 80° C. and then separating the lead tetracetate so formed.

This method is very tedious and also suffers from the disadvantages inherent in the instability of lead tetracetate. Thus there is considerable tendency for lead dioxide to be formed by hydrolysis of the lead tetracetate, not only during the isolation but also during the actual formation of this body. This results in a loss of oxidising power.

It has also been proposed in one or two instances to effect the oxidations by slowly adding red lead at about 55–65° C. to a stirred solution of the oxidisable substance in a large excess of glacial acetic acid. Here again there is the disadvantage that under these conditions the reaction cannot be carried out rapidly. Moreover a relatively complicated apparatus is required, particularly when, as is often the case, the necessity arises of avoiding loss of volatile starting materials or products.

In accordance with the invention organic compounds oxidisable by means of lead tetracetate are oxidised by mixing at least part of the oxidisable compound, a carboxylic acid, especially a lower aliphatic acid, and red lead at a temperature below 40° C. and completing the reaction at a temperature above 40° C., e. g. 55–90° C., while maintaining in the reaction zone, throughout substantially the whole of the reaction period an amount of oxidisable compound at least equivalent to the amount of lead tetra-salt present. Conveniently the major part of the oxidation is effected at 55–90° C.

The invention will now be described more particularly in connection with the use of acetic acid as the carboxylic acid.

Oxidations in accordance with the invention can be effected with considerable facility by mixing the oxidisable substance at about room temperature with acetic acid and with sufficient red lead to effect the desired oxidation, and then warming while stirring or otherwise agitating the mixture. Alternatively the oxidisable substance can be added to the mixture of red lead and acetic acid during the warming, the rate of addition of said oxidisable substance being at least equivalent to the rate at which the red lead reacts with the acetic acid. In this way it is ensured that the lead tetracetate is utilised as it is formed.

Under the new conditions described above the red lead dissolves comparatively rapidly, and there is little or no separation of lead dioxide with consequent loss of oxidising power. The separation of lead dioxide is, as indicated above, particularly liable to occur when lead tetracetate is prepared by the usual method of slowly adding red lead to warm stirred acetic acid. Even more have I found this to be the case when the red lead and acetic acid are mixed in the cold in the absence of an oxidisable substance and then warmed with stirring. Moreover, as compared with any of the procedures hitherto employed, the present process offers the advantage that the whole of the red lead can be mixed quickly in one batch with the acetic acid. This results not only in saving of time, but also in many cases in a simplification of the apparatus.

The new process is of special value for the conversion of alpha-glycols to aldehydes, e. g. the production of formaldehyde from ethylene glycol, of acetaldehyde and formaldehyde from 1:2 propylene glycol, and of adipic dialdehyde from cyclohexane-1:2-diol. It can, however, also be used successfully to effect the other oxidations for which lead tetracetate is suitable.

The initial temperature at which the various ingredients are mixed is preferably below about 30° C. As regards the warming, this should be continued to a temperature and for a time necessary to complete the desired reaction. Where possible it is of advantage that the maximum temperature should not exceed about 75-90° C., and the warming is best conducted at such a rate that the lead tetracetate is utilised by the oxidisable substance continuously with its formation.

It should be noted that the weight of red lead necessary will vary according to the particular sample employed, since as is well-known, the amount of available oxygen is generally somewhat less than that corresponding to the formula $Pb_3O_4$.

Acetic anhydride can also be present in the reaction mixture, if desired, in an amount sufficient to combine with any water formed. This is of advantage, particularly when the conversion of the oxidisable substance is rather slow, since it reduces any tendency for the lead tetracetate formed to hydrolyse to lead dioxide. Again it is possible to include benzene or other inert solvent for lead tetracetate in the reaction mixture as part of the medium, in which case the amount of acetic acid can be reduced even to as low a value as that theoretically required to combine with the red lead. In this case also it may be of advantage to include acetic anhydride in the reaction mixture. When the nature of the oxidisable substance and the oxidation products permit the amount of substance oxidised by a given weight of red lead can be increased by passing chlorine through the reaction mixture.

Although the present invention has been described with special reference to oxidations with red lead and acetic acid, it can also, as mentioned above, be applied to the use of red lead and other carboxylic acids, for example propionic acid.

The invention is illustrated by the following example, all parts being by weight.

*Example*

750 parts of red lead are added at room temperature to a mixture of 62 parts of ethylene glycol, or 76 parts of propylene glycol, and 2500 parts of glacial acetic acid. The mixture shows a slight, spontaneous temperature rise. It is warmed with vigorous stirring to 60° C. or 70° C. and held at this temperature until all the red lead has gone into solution. This should take about half an hour and there should be little if any separation of lead dioxide. Almost quantitative yields of formaldehyde (from ethylene glycol) or formaldehyde and acetaldehyde (from propylene glycol) are obtained.

As an alternative to the procedure of the above example, the reaction mixture can consist initially of the whole of the red lead and acetic acid and a small proportion of the glycol, say 6.2 parts of ethylene glycol or 7.6 parts of propylene glycol. The warming is effected as before and the rest of the glycol added at such a rate as to prevent any substantial separation of lead dioxide. Good yields of aldehydes are obtained.

Having described my invention what I desire to secure by Letters Patent is:

1. Process for the oxidation of alpha-glycols, which comprises mixing together at a temperature below about 30° C. a substantially molecular part of alpha-glycol, about 1.1 molecular parts of red lead and an excess of glacial acetic acid and thereafter warming the mixture to a temperature of 60 to 90° C. until the oxidation of the alpha-glycol is complete.

2. Process for the production of formaldehyde from ethylene gylcol, which comprises mixing together at a temperature below about 30° C. a substantially molecular part of ethylene glycol, about 1.1 molecular parts of red lead and an excess of glacial acetic acid and thereafter warming the mixture to a temperature of 60 to 90° C. until the oxidation of the ethylene glycol is complete.

3. Process for the production of formaldehyde and acetaldehyde from propylene glycol, which comprises mixing together at a temperature below about 30° C. a substantially molecular part of propylene glycol, about 1.1 molecular parts of red lead and an excess of glacial acetic acid and thereafter warming the mixture to a temperature of 60 to 90° C. until the oxidation of the propylene glycol is complete.

JAMES GORDON NAPIER DREWITT.